United States Patent
Ippatapu

(10) Patent No.: US 11,146,663 B2
(45) Date of Patent: Oct. 12, 2021

(54) FACILITATING IMPROVED OVERALL PERFORMANCE OF REMOTE DATA FACILITY REPLICATION SYSTEMS

(71) Applicant: EMC IP Holding Company LLC, Hopkinton, MA (US)

(72) Inventor: Venkata L. R. Ippatapu, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 21 days.

(21) Appl. No.: 16/515,597

(22) Filed: Jul. 18, 2019

(65) Prior Publication Data

US 2021/0021693 A1 Jan. 21, 2021

(51) Int. Cl.
*H04L 29/06* (2006.01)
*H04L 29/08* (2006.01)
*H04L 12/26* (2006.01)

(52) U.S. Cl.
CPC .......... *H04L 69/02* (2013.01); *H04L 43/0864* (2013.01); *H04L 67/1095* (2013.01); *H04L 69/04* (2013.01)

(58) Field of Classification Search
CPC . H04L 69/02; H04L 43/0864; H04L 67/1095; H04L 69/04
USPC ......................................................... 709/223
See application file for complete search history.

(56) References Cited

U.S. PATENT DOCUMENTS

| | | | | |
|---|---|---|---|---|
| 7,180,858 B1* | 2/2007 | Roy | ..................... | H04L 43/0888 370/229 |
| 8,417,833 B1* | 4/2013 | Amdahl | ................... | H04L 69/04 709/247 |
| 9,398,489 B1* | 7/2016 | Akhter | ................... | H04W 28/06 |
| 10,827,039 B1* | 11/2020 | Dandekar | ............... | H04L 69/04 |
| 2004/0205166 A1* | 10/2004 | DeMoney | ............... | G06F 3/061 709/219 |
| 2010/0246602 A1* | 9/2010 | Barreto | ................... | H04L 69/04 370/466 |

(Continued)

OTHER PUBLICATIONS

Comparitech, Feb. 5, 2019, Retrieved via URL: https://www.comparitech.com/net-admin/latency-vs-throughput/ (Year: 2019).*

*Primary Examiner* — Tonia L Dollinger
*Assistant Examiner* — Schquita D Goodwin
(74) *Attorney, Agent, or Firm* — Amin, Turocy & Watson, LLP

(57) ABSTRACT

Facilitating improved overall performance of remote data facility replication systems. A device can comprise a processor and a memory that stores executable instructions that, when executed by the processor, facilitate performance of operations. The operations can comprise adjusting, by a device comprising a processor, a value of a compression counter based on global system attributes associated with a remote data facility replication system and an application service performance expectation. The method also can comprise performing, by the device, one of: facilitating a data compression of a group of data blocks based on the value of the compression counter satisfying a threshold compression level or storing the group of data blocks without the data compression based on the value of the compression counter failing to satisfy the threshold compression level.

20 Claims, 10 Drawing Sheets

(56) References Cited

U.S. PATENT DOCUMENTS

| | | | | |
|---|---|---|---|---|
| 2014/0067994 | A1* | 3/2014 | Puttaswamy Naga | ........................ H04L 67/1095 709/217 |
| 2014/0082219 | A1* | 3/2014 | Karaoguz | ............... G05B 13/02 709/246 |
| 2014/0146670 | A1* | 5/2014 | Bokish | ................... H04L 43/16 370/230 |
| 2014/0201175 | A1* | 7/2014 | Ohno | ................. G06F 16/1744 707/693 |
| 2015/0110131 | A1* | 4/2015 | Roskind | .............. H04L 63/1441 370/465 |
| 2016/0054938 | A1* | 2/2016 | Owa | ..................... G06F 3/0679 711/103 |
| 2017/0195462 | A1* | 7/2017 | Kfir | ....................... H04L 63/123 |
| 2018/0131749 | A1* | 5/2018 | Dobrenko | ............ H04L 43/0817 |
| 2018/0152201 | A1* | 5/2018 | Gopal | ........................ G06F 7/06 |
| 2018/0241679 | A1* | 8/2018 | Muscariello | ........... H04L 67/327 |

\* cited by examiner

FACILITATING IMPROVED OVERALL PERFORMANCE OF REMOTE DATA FACILITY REPLICATION SYSTEMS

TECHNICAL FIELD

The subject disclosure relates generally to data storage and communications. More specifically, the subject disclosure relates to remote data facility replication systems and related performance of such systems.

BACKGROUND

Data systems, such as Remote Data Facility (RDF) replication systems, can require the storage and communication of increasing amounts of data. Reducing the size of this data can mitigate both the cost and time associated with storing and communicating the data. An example of reducing the size of data can include compression of the data.

Further, the performance of RDF replication systems can be measured in terms of replication throughput and/or latency of the host input/output data. Compression of the data before dispatching the data to the network can reduce the network bandwidth usage. However, the enablement of data compression before dispatching the data to the network without considering overall RDF application system behavior may negatively impact the performance of the host input/output data.

The above-described context with respect to conventional replication systems is merely intended to provide an overview of current technology, and is not intended to be exhaustive. Other contextual description, and corresponding benefits of some of the various non-limiting embodiments described herein, can become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, provided herein is a system that can comprise a processor and a memory that stores executable instructions that, when executed by the processor, facilitate performance of operations. The operations can comprise evaluating a performance of a remote data facility replication system according to a defined performance metric. The evaluation of the performance can be in response to receipt of a sequence of data blocks that are candidates for data reduction in the remote data facility replication system. The operations also can comprise facilitating a compression of the sequence of data blocks based on the evaluation of the performance indicating that the data reduction of the sequence of data blocks increases the performance of the remote data facility replication system above a defined performance level.

According to some implementations, the operations can comprise, prior to facilitating the compression of the sequence of data blocks, comparing a value of a compression counter with a baseline value. The operations also can comprise determining the compression of the sequence of data blocks is to be performed based on the value of the compression counter being more than the baseline value.

In an example, the defined performance metric can be a performance expectation. Further to this example, evaluating the performance of the remote data facility replication system can comprise increasing the value of the compression counter based on a determination that a profile of the remote data facility replication system is a data throughput sensitive system. Alternatively, evaluating the performance of the remote data facility replication system can comprise decreasing the value of the compression counter based on a second determination that the profile of the remote data facility replication system is a latency sensitive system.

In another example, the defined performance metric can be a performance expectation. Further to this example, evaluating the performance of the remote data facility replication system can comprise increasing the value of the compression counter based on a determination that a defined data throughput is less than an expected compression throughput. The expected compression throughput can be defined as a maximum compression throughput less a current workload rate.

According to another example, the defined performance metric can be a performance expectation. Further to this example, evaluating the performance of the remote data facility replication system can comprise decreasing the value of the compression counter based on a determination that a defined data throughput is more than an expected compression throughput.

According to another example, the defined performance metric can be a performance expectation. Further to this example, evaluating the performance of the remote data facility replication system can comprise increasing the value of the compression counter based on a determination that a defined latency is more than twice an expected compression latency. The expected compression latency can be defined as an average latency for the compression of the sequence of data blocks.

In accordance with another example, the defined performance metric can be a performance expectation. Further to this example, evaluating the performance of the remote data facility replication system can comprise decreasing the value of the compression counter based on a determination that a defined latency is less than twice an expected compression latency.

According to some implementations, the defined performance metric can be a round-trip time of a data packet in the remote data facility replication system. Further to these implementations, evaluating the performance of the remote data facility replication system can comprise increasing a value of a compression counter based on a determination that the round-trip time is more than a defined time interval. Alternatively, these implementations can comprise decreasing a value of a compression counter based on a determination that the round-trip time is less than a defined time interval.

In some implementations, compression of the sequence of data blocks is not performed based on the evaluation of the performance indicating that the data reduction does not increase the performance of the remote data facility replication system above the defined performance level.

Another embodiment relates to a method that can comprise adjusting, by a device comprising a processor, a value of a compression counter based on global system attributes associated with a remote data facility replication system and an application service performance expectation. The method also can comprise performing, by the device, one of: facilitating a data compression of a group of data blocks based on the value of the compression counter satisfying a threshold compression level or storing the group of data blocks without the data compression based on the value of the compression counter failing to satisfy the threshold compression level.

According to some implementations, the global system attributes can comprise a workload of a compression component that performs the data compression. The method can comprise incrementing, by the device, the compression counter based on a defined data throughput satisfying an expected compression throughput. The expected compression throughput can be a maximum compression throughput minus a current workload rate of the compression component. Alternatively, the method can comprise decrementing, by the device, the compression counter based on a defined data throughput failing to satisfy the expected compression throughput.

In accordance with some implementations, the global system attributes can comprise a workload of a compression component that performs the data compression. Further to these implementations, the method can comprise incrementing, by the device, the compression counter based on a defined latency satisfying an amount that is double an expected compression latency value. The expected compression latency value can be defined as an average latency for compression of a sequence of data blocks. Alternatively, the method can comprise decrementing, by the device, the compression counter based on a defined latency failing to satisfy an amount that is double the expected compression latency value.

In some implementations, the global system attributes comprise a round-trip time of a data packet in the remote data facility replication system. Further to these implementations, the method can comprise incrementing, by the device, the compression counter based on a first determination that the round-trip time satisfies a defined time interval. Alternatively, the method can comprise decrementing, by the device, the compression counter based on a second determination that the round-trip time fails to satisfy the defined time interval.

According to some implementations, the method can comprise incrementing, by the device, the compression counter based on a first determination that the remote data facility replication system is a data throughput sensitive system. Alternatively, the method can comprise decrementing, by the device, the compression counter based on a second determination that the remote data facility replication system is a latency sensitive system.

Another embodiment relates to a computer-readable storage medium comprising instructions that, in response to execution, cause a system comprising a processor to perform operations. The operations can comprise evaluating parameters of a remote data facility replication system. The parameters can be related to global system attributes and service performance expectations of the remote data facility replication system. The operations also can comprise adjusting a combined value of a counter based on respective values for the parameters determined based on the evaluating. Further, the operations can comprise determining to perform compression on a set of data based on the combined value of the counter satisfying a defined value, or to not perform the compression on the set of data based on the combined value of the counter failing to satisfy the defined value.

According to some implementations, adjusting the combined value can comprise increasing the combined value of a data counter based on one or more determinations. For example, a first determination can be that a profile of the remote data facility replication system is a data throughput sensitive system. A second determination can be that a defined data throughput satisfies an expected compression throughput, wherein the expected compression throughput is defined as a maximum compression throughput less a current workload rate. The third determination can be that a defined latency is more than twice an expected compression latency, wherein the expected compression latency is defined as an average latency for the compression of a sequence of data blocks. In addition, a fourth determination can be that a round-trip time of a data packet in the remote data facility replication system satisfies a defined time interval.

In accordance with some implementations, adjusting the combined value can comprise decreasing the combined value of a data counter based on one or more determinations. A first determination can be that a profile of the remote data facility replication system is a latency sensitive system. A second determination can be that a defined data throughput fails to satisfy an expected compression throughput, wherein the expected compression throughput is defined as a maximum compression throughput less a current workload rate. A third determination can be that a defined latency is less than twice an expected compression latency, wherein the expected compression latency is defined as an average latency for the compression of a sequence of data blocks. In addition, a fourth determination can be that a round-trip time of a data packet in the remote data facility replication system fails to satisfy a defined time interval.

To the accomplishment of the foregoing and related ends, the disclosed subject matter comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

Figure 1:
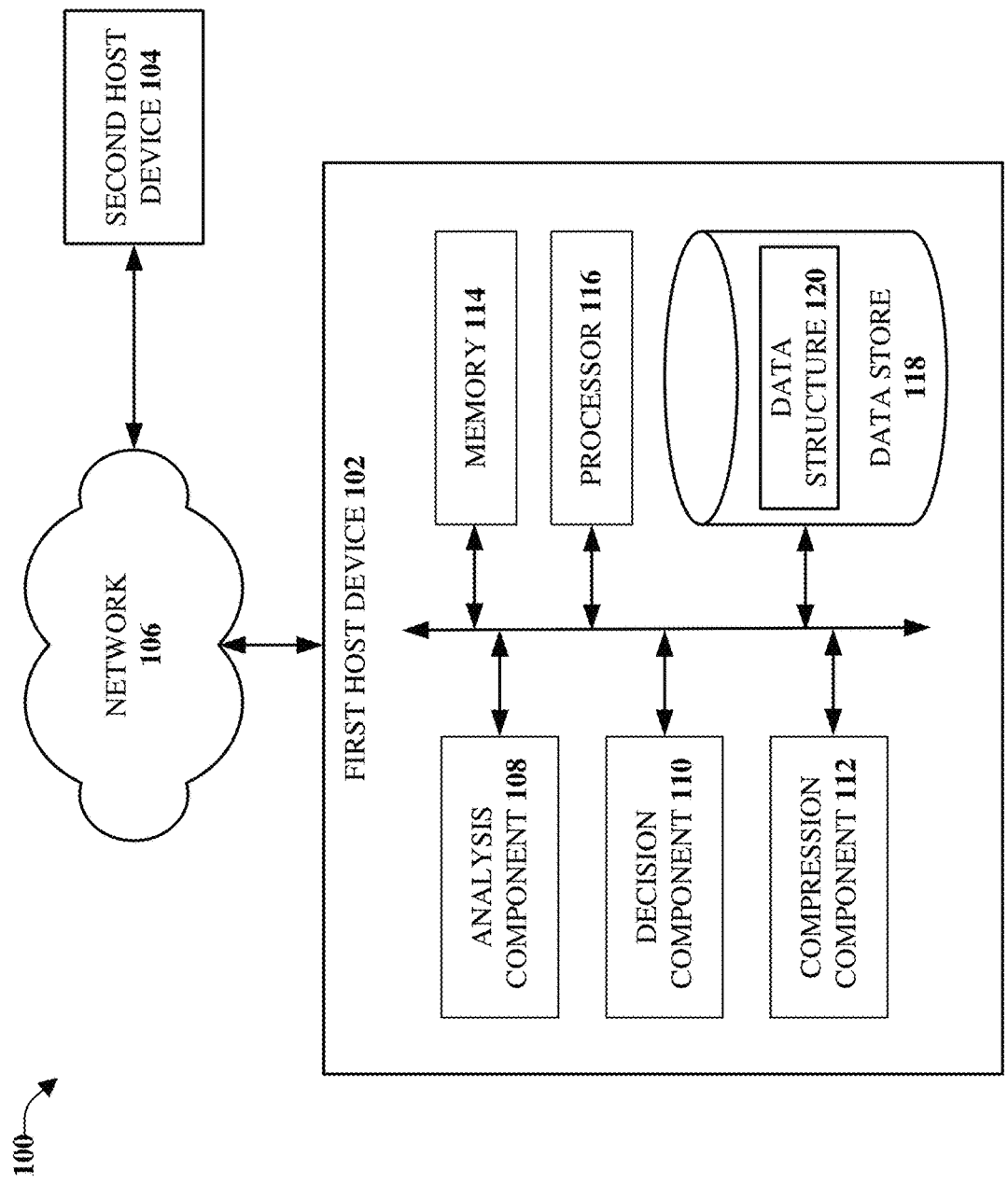
FIG. 1 illustrates a block diagram of an example, non-limiting, system for facilitating improved overall performance of remote data facility replication systems in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

The performance of Remote Data Facility (RDF) replication systems can be measured broadly in terms of replication throughput and/or latency of the Host Input/Output (I/O) data. Some RDF profiles for systems and/or deployments could demand high data throughput over latency. Other RDF profiles for systems and/or deployments could demand faster replication (e.g., low latency over data throughput). Further, some RDF profiles for systems and/or deployments could demand both high data throughput and faster replication. Traditionally, the replication systems compress the data before dispatching the data to the network. Compression can reduce the network bandwidth usage. However, it has been found that simple enablement of data compression before dispatching the data to the network without considering the overall system behavior can cause the performance of the host I/O data to suffer.

For example, the RDF performance expectation criteria (such as a data throughput sensitive system or/and a latency sensitive system) can be crucial to adaptively change the behavior of the underlying data reduction module (e.g., a compression component) to meet the expectation of the RDF customer systems. Traditional data reduction infrastructures can be completely obscure of the desired performance expectations. The lack of this knowledge can alter the desired behavior of the system and can cause greater loss of performance than what was expected when data compression is enabled.

Further, the traditional architecture runs several applications that concurrently use the same data compression module. Such applications include RDF modules for data replication and backend applications to decompress the disc data. Additionally, the same compression component performs deduplication for backend data storage reduction, which can add additional pressure to the compression module. RDF demands often exceed available bandwidth, leading to large sender-side queues and can introduce head-of-line blocking (e.g., a delay that occurs when a line of messages is held up by the first message). Traditional infrastructures do not take this crucial runtime data reduction module behavior into consideration and adds additional processing delays to the host data.

Network behavior can also play a vital and important role in the RDF performance and improper data compression settings can completely toggle the desired behavior if the network is not considered. Thus, as discussed herein, the compression module can dispatch the buffers data quickly to the network if the network is not bandwidth bounded. Further, as discussed herein, the compression module can compress the data as much as possible if the network is congested and round-trip time of the packets are large. Therefore, the disclosed aspects can counteract the traditional infrastructure deficiencies and includes an intelligent multiple criteria decision performance-oriented architecture to improve the overall performance of replication systems.

FIG. 1 illustrates a block diagram of an example, non-limiting, system 100 for facilitating improved overall performance of remote data facility replication systems in accordance with one or more embodiments described herein. Aspects of systems (e.g., the system 100 and the like), apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated, a first host device 102 can be coupled to at least a second host device 104 by employing a network 106 (e.g., a remote data facility replication system). The first host device 102 can comprise an analysis component 108, a decision component 110, a compression component 112, at least one memory 114, at least one processor 116, and at least one data store 118, which can provide persistent storage to one or more embodiments, including by employing the use of a data structure 120. Generally speaking, in some circumstances, data structures (e.g., the data structure 120) can be used to organize data so as to facilitate the performance of different operations (e.g., manipulation and searching). Because one or more embodiments described herein can use both of these operations extensively, some implementations described herein can use a data structure.

At least the second host device 104 can comprise one or more of the components and/or functionality of the first host device 102, and vice versa.

The system 100 can provide a sophisticated intelligent framework to leverage the performance of replication storage systems by intelligently making a precise decision at any given time of data replication and under any given circumstances to replicate as much data as possible by considering the sum of overall system behavior as well as the desired expectation of the system 100, which can be an RDF system. The system 100 can guarantee desired performance behavior and can proactively take measures to eliminate data link loss risks, reduce overall response time, and ensure high data availability across replication systems. Accordingly, the disclosed aspects can perform am accurate decision-making model that meets multiple criteria at substantially the same time.

The analysis component 108 (also referred to herein as a Decision as a Service (DAAS) Unit) can concisely and precisely consider complete system behavior. Examples of system behavior can include, but are not limited to, RDF performance expectations, a current workload on the compression component 112, and/or underlying network behavior. Further, the analysis component 108 can accurately make a meticulous decision for data reduction modules of the storage system (e.g., the at least one data store 118). For every criterion, the analysis component 108 can decide and upvote (e.g., increment a counter) if the decision is positive and is in favor of data compression, otherwise the analysis component 108 can downvote (e.g., decrement a counter).

The decision component 110 (also referred to as a Data Reduction Controller Unit herein) can perform a final decision based on the decisions obtained from the analysis component 108. For example, if the combined number of upvotes/decisions in favor of data reduction is greater than a combined number of downvotes/decisions not in favor of data reduction, then the host data are selected for data reduction (e.g., by the compression component 112). Otherwise, if the combined number of downvotes/decisions not in favor of data reduction are greater than a combined number of upvotes/decisions in favor of data reduction, the host data is not selected for data reduction and can be stored without data compression.

The disclosed aspects can embed system behavior learning and artificial intelligence in the fast path and can provide an infrastructure to make a precise intelligent decision which is a function of several criteria. Also, any change in runtime overall system behavior (e.g., network reconfiguration, increased workload, and so on) can fluctuate desired performance. Accordingly, the disclosed aspects can allow replication systems to adjust to such external network events automatically without any drop-in throughput performance and little, if any, negative impact on product and business value. Further, the disclosed aspects do not utilize extra dependencies and can be utilized with legacy systems, which is strategically significant and provides a cutting-edge solution. In addition, the disclosed aspects can be fully automated and can be adaptive to run time behavior, which does not need manual intervention to tune the system to meet desired expectations.

The at least one memory 114 can be operatively connected to the at least one processor 116. The at least one memory 114 can store executable instructions and/or computer executable components (e.g., the analysis component 108, the decision component 110, the compression component 112, and so on) that, when executed by the at least one processor 116 can facilitate performance of operations. Further, the at least one processor 116 can be utilized to execute computer executable components (e.g., the analysis component 108, the decision component 110, the compression component 112, and so on) stored in the at least one memory 114.

For example, the at least one memory 114 can store protocols associated with facilitating improved overall performance of remote data facility replication systems as discussed herein. Further, the at least one memory 114 can facilitate action to control communication between the first host device 102, at least the second host device 104, other host devices, and/or the network 106 such that the first host device 102 can employ stored protocols and/or algorithms to achieve improved overall performance of remote data facility replication systems as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 116 can facilitate respective analysis of information related to facilitating improved overall performance of remote data facility replication systems. The at least one processor 116 can be a processor dedicated to analyzing and/or generating information received, a processor that controls one or more components of the first host device 102, and/or a processor that both analyzes and generates information received and controls one or more components of the first host device 102.

Figure 2:
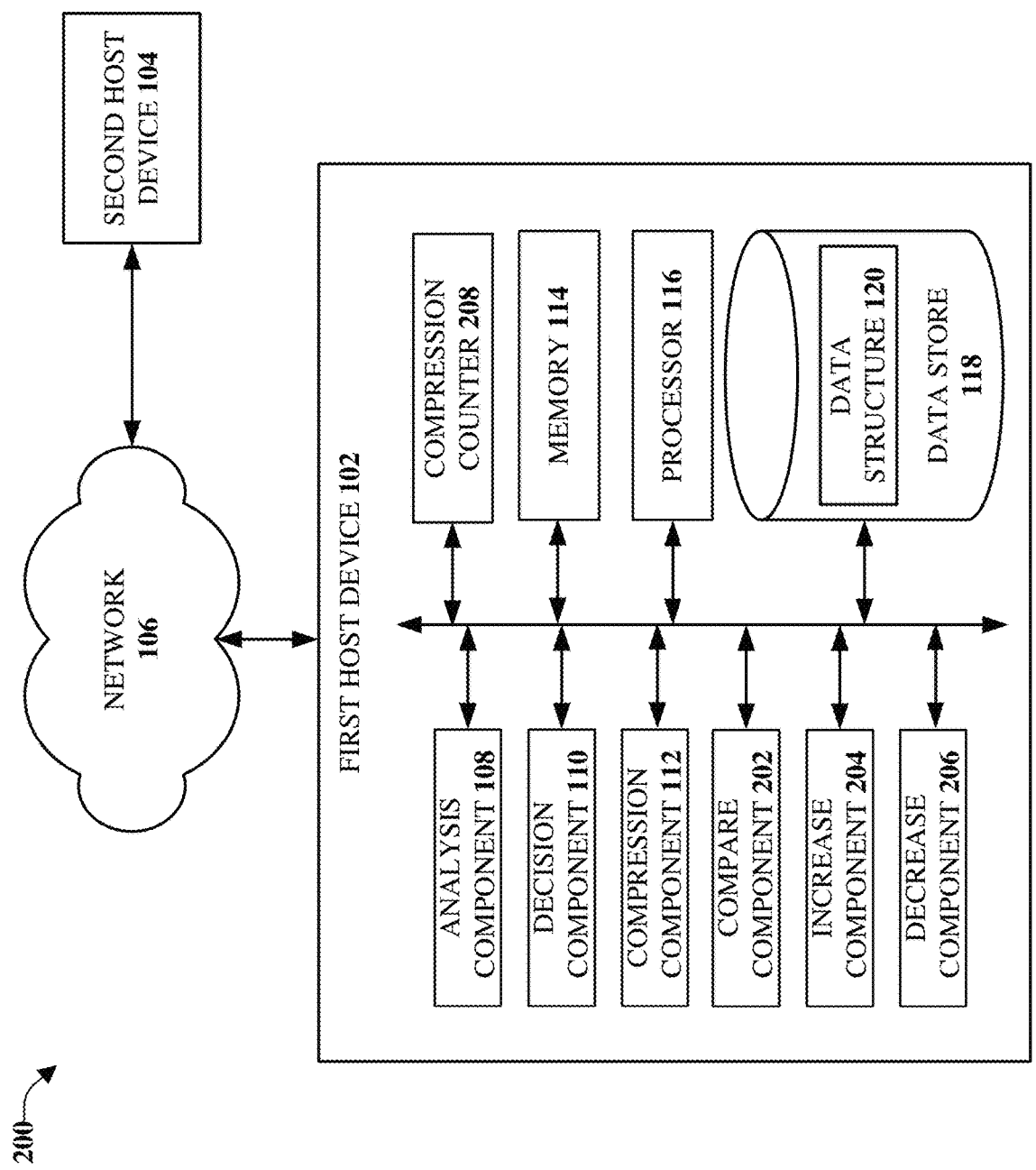
FIG. 2 illustrates an example, non-limiting, system that can evaluate performance of a remote data facility replication system and selectively compress a sequence of data blocks based on the evaluated performance in accordance with one or more embodiments described herein.

FIG. 2 illustrates an example, non-limiting, system 200 that can evaluate performance of a remote data facility replication system and selectively compress a sequence of data blocks based on the evaluated performance in accordance with one or more embodiments described herein. Repetitive description of like elements employed in other embodiments described herein is omitted for sake of brevity. The system 200 can comprise one or more of the components and/or functionality of the system 100, and vice versa.

As illustrated the first host device 102 can comprise a compare component 202, an increase component 204, and a decrease component 206. The analysis component 108 can evaluate a performance of a remote data facility replication system according to a defined performance metric. For example, the analysis component 108 can evaluate the performance in response to receipt of a sequence of data blocks that are candidates for data reduction in the remote data facility replication system.

Further, the compression component 112 can facilitate a compression of the sequence of data blocks based on the analysis component 108 indicating that the data reduction of the sequence of data blocks increases the performance of the remote data facility replication system above a defined performance level, as determined by the decision component 110. Alternatively, if the analysis component 108 indicates that the data reduction does not increase the performance of the remote data facility replication system above the defined performance level, as determined by the decision component 110, the compression component 112 does not compress the sequence of data blocks.

In further detail, the system 200 can concisely and precisely consider complete system behavior including, but not limited to, the RDF performance expectation criteria, current workload on a compression unit (e.g., the compression component 112), underlying network behavior, and so on. Based on the complete system behavior considerations, the disclosed aspects can accurately make a meticulous decision for data reduction modules of the storage system. For every criterion, the analysis component 108 can make a determination and upvote (e.g., via the increase component 204) if the determination is positive and is in favor of data compression, otherwise downvote (e.g., via the decrease component 206).

As mentioned, some RDF profiles system/deployments demand high data throughput over latency, some demand faster replication (e.g., low latency over data throughput), and some demand both. Replicating compressed data decreases the network bandwidth usage and increases the host data I/O throughput, whereas on a latency sensitive system, the compression module adds a lot of offload overhead to compress and decompress the data. The desired behavior information is extremely important to adaptively make a right decision for data reduction infrastructure to better serve the application needs.

Overall latency of I/O is approximately equal to the processing overhead on a local system (R1) plus the Compression Module Latency plus the Network Latency plus the Decompression Module Latency plus the Processing overhead on a remote system (R2).

The increase component 204 can upvote the decision to compress on data throughput sensitive systems and conditional decision vote on latency bound systems. The conditional decision can be decided by the expected processing latency of the compression component 112. However, this is not the final decision and the analysis component 108 and/or the decision component 110 can consider several other global system factors when making a final decision. The below is an example of decisions that can be made:

Decision =YES {Data Throughput Sensitive Systems}
=NO {Latency Sensitive Systems}

Thus, if the system is a data throughput sensitive system, the decision can be that compression should be performed and the increase component 204 can increase a value of the compression counter 208. If the system is a latency sensitive system, the decision can be that compression should not be performed and the decrease component 206 can decrease a value of the compression counter.

Traditional approaches can run several applications that concurrently use the same data compression module such as RDF modules for data replication and backend applications to decompress the disc data. Additionally, for traditional systems, the same compression component performs deduplication for backend data storage reduction, adding a large amount of pressure to the compression component module. In such approaches, the RDF demands often exceed available bandwidth, leading to large sender-side queues. These queues can introduce head-of-line blocking (a delay that occurs when a line of packets is held up by the first message) and can add a large amount of latency to replication data. The compression busy counts can reach up to the magnitude of tens of thousands for every single command in traditional approaches. In such cases and highly evident scenarios, there is huge queuing delays and head-of-line blocking which degrades complete RDF performance by adding a large amount of latency.

To overcome such issues, the increase component 204 can upvote the decision to compress only when the compression module has resources available enough to meet the RDF performance expectations. The decrease component 206 can downvote to not compress when there is lack of resources.

According to some implementations, the expected compression throughput can be equal to the maximum compression throughput minus the current workload rate. Further, the expected latency of compression component can be equal to the average latency/second of the compression component. For example, decisions can include:

=YES {RDF desired/expected Data Throughput<Expected Compression Throughput}
=NO {RDF desired/expected Data Throughput>Expected Compression Throughput}
=YES {RDF desired Latency>2*Expected Compression Latency}
=NO {RDF desired Latency<2*Expected Compression Latency}

It is noted that the expected compression latency is multiplied by at least a factor of two since there would be additional processing of host data on local and remote systems. It is noted that the above decisions are not the final decision and the analysis component 108 and/or the decision component 110 can consider several other global system factors when making a final decision. Further, the RDF desired/expected data throughput and/or RDF desired latency can be (different) configurable values, which can be selected based on design choice, for example.

In further detail, according to an implementation, the compare component 202 can compare a value of a compression counter 208 with a baseline value, which can be a configurable value based on a design choice, for example. If the value of the compression counter 208 is equal to or more than the baseline value, the decision component 110 can determine that compression of the sequence of data blocks is to be performed. Alternatively, if the value of the compression counter 208 is less than the baseline value, the decision component 110 can determine that compression of the sequence of data blocks is not to be performed.

According to some implementations, the defined performance metric can be a performance expectation and the analysis component 108 can determine that a profile of the remote data facility replication system is a data throughput sensitive system. Therefore, the increase component 204 can increase the value of the compression counter 208 due to the system being the data throughput sensitive system.

In another implementation where the defined performance metric can be the performance expectation, the decrease component 206 can decrease the compression counter 208 based on a determination by the analysis component 108 that a profile of the remote data facility replication system is a latency sensitive system.

In a further implementation, the defined performance metric can be a performance expectation, the increase component 204 can increase the value of the compression counter 208 based on a determination that a defined data throughput is less than an expected compression throughput. The expected compression throughput can be defined as a maximum compression throughput less a current workload rate.

In a further implementation, the defined performance metric can be a performance expectation and the decrease component 206 can decrease the value of the compression counter 208 based on a determination that a defined data throughput is more than the expected compression throughput.

In another example, the increase component 206 can increase the value of the compression counter based on a determination that a defined latency is more than twice an expected compression latency. The expected compression latency can be defined as an average latency for the compression of the sequence of data blocks.

According to another example, the decrease component 206 can decrease the value of the compression counter based on a determination that a defined latency is less than twice an expected compression latency.

According to some implementations, the defined performance metric can be a round-trip time of a data packet in the remote data facility replication system. Further to these implementations, the increase component 204 can increase a value of the compression counter 208 based on a determination that the round-trip time is more than a defined time interval. Alternatively, the decrease component 206 can decrease a value of the compression counter 208 based on a determination that the round-trip time is less than a defined time interval.

According to an example, the increase component 204 can increase the compression counter 208 based on the remote data facility replication system being a replication data throughput sensitive system, the RDF desired/RDF desired/expected Data Throughput<Expected Compression Throughput, the RDF desired Latency>2*Expected Compression Latency, and/or the RTT>a defined value (e.g., 5 or another value). Alternatively or additionally, the decrease component 206 can decrease the compression counter 208 based on the remote data facility replication system being a latency sensitive system, NO {RDF desired/expected Data Throughput>Expected Compression Throughput}, RDF desired Latency<2*Expected Compression Latency, and/or RTT<the defined value.

Figure 3:
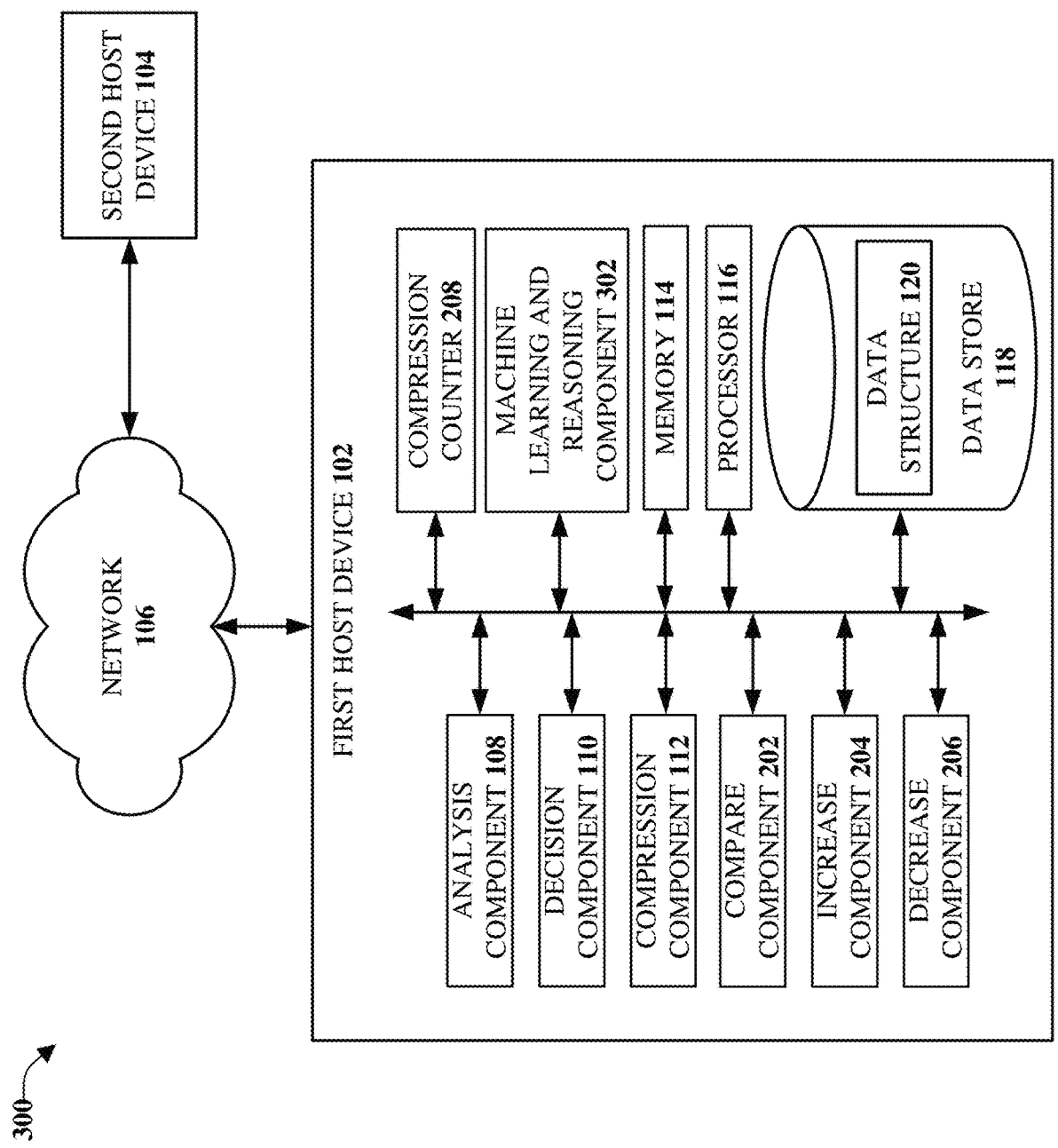
FIG. 3 illustrates an example, non-limiting, system that employs automated learning to facilitate one or more of the disclosed aspects in accordance with one or more embodiments described herein.

FIG. 3 illustrates an example, non-limiting, system 300 that employs automated learning to facilitate one or more of the disclosed aspects in accordance with one or more embodiments described herein. Repetitive description of like elements employed in other embodiments described herein is omitted for sake of brevity. The system 300 can comprise one or more of the components and/or functionality of the system 100, the system 200, and vice versa.

As illustrated, the first host device 102 can comprise a machine learning and reasoning component 302 that can be utilized to automate one or more of the disclosed aspects. The machine learning and reasoning component 302 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 302 can employ principles of probabilistic and decision theoretic inference. Additionally, or alternatively, the machine learning and reasoning component 302 can rely on predictive models constructed using machine learning and/or automated learning procedures. Logic-centric inference can also be employed separately or in conjunction with probabilistic methods.

The machine learning and reasoning component 302 can infer performance of a remote data facility replication system and determine whether or not one or more sets of data should be compressed by obtaining knowledge about a profile of the remote data facility replication system, one or more performance expectations, round-trip time of a data packet, and so on. Based on this knowledge, the machine learning and reasoning component 302 can make an inference based on which data to compress, which data should not be compressed and stored as is, or combinations thereof.

As used herein, the term "inference" refers generally to the process of reasoning about or inferring states of a system, a component, a module, an environment, and/or devices from a set of observations as captured through events, reports, data and/or through other forms of communication. Inference can be employed to identify whether compression should be performed or should not be performed, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with evaluating a remote data facility replication system and its related performance including, but not limited to, throughput and latency) can employ various artificial intelligence-based schemes for carrying out various aspects thereof. For example, a process for determining if a particular data or set of data should be compressed prior to storage, or should be stored in a non-compressed state can be enabled through an automatic classifier system and process.

A classifier is a function that maps an input attribute vector, x=(x1, x2, x3, x4, xn), to a confidence that the input belongs to a class. In other words, f(x)=confidence(class). Such classification can employ a probabilistic and/or statistical-based analysis (e.g., factoring into the analysis utilities and costs) to provide a prognosis and/or infer one or more actions that should be employed to determine when compression should be automatically performed. A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing system behavior, by receiving intrinsic information, by receiving extrinsic information, and so on). For example, SVMs can be configured through a learning or training phase within a classifier constructor and feature selection module. Thus, a classifier(s) can be used to automatically learn and perform a number of functions, including but not limited to determining, according to a predetermined criterion, when to compress data, when to not compress data, and so forth.

Additionally, or alternatively, an implementation scheme (e.g., a rule, a policy, and so on) can be applied to control and/or regulate when to (or when not to) compress data prior to storage of the data. In some implementations, based upon a predefined criterion, the rules-based implementation can automatically and/or dynamically compress/not compress data. In response thereto, the rule-based implementation can automatically interpret and carry out functions associated with the selective compression by employing a predefined and/or programmed rule(s) based upon any desired criteria.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 4:
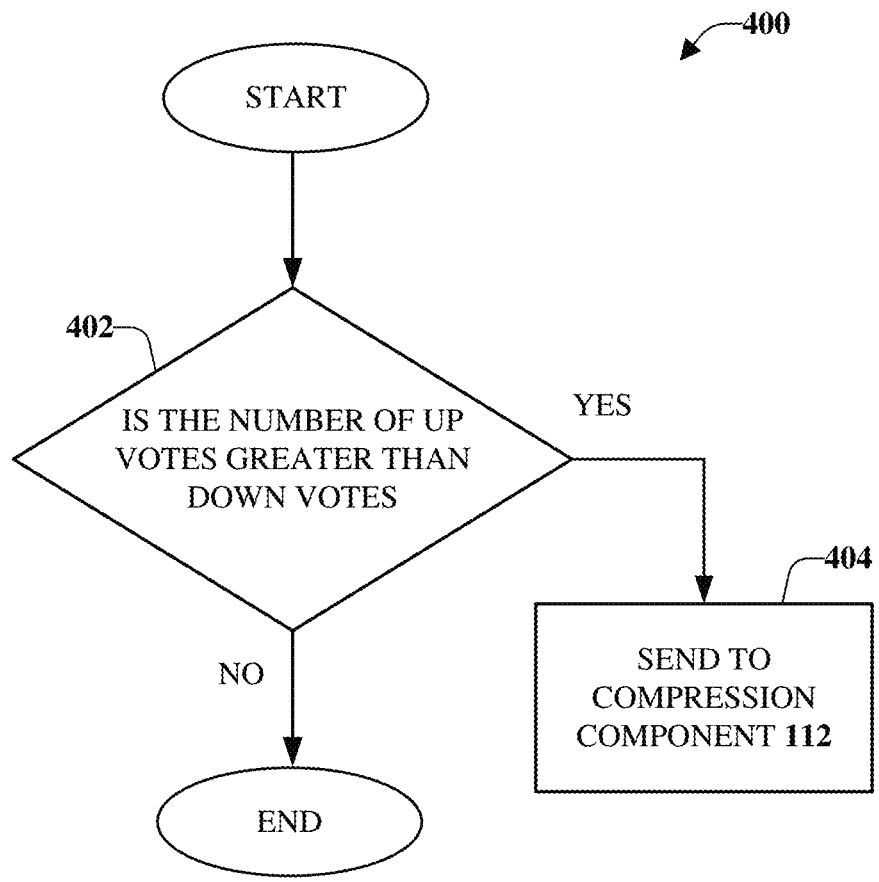
FIG. 4 illustrates a flow diagram of an example, non-limiting, computer-implemented method that facilitates improved overall performance of remote data facility replication systems in accordance with one or more embodiments described herein.

FIG. 4 illustrates a flow diagram of an example, non-limiting, computer-implemented method 400 that facilitates improved overall performance of remote data facility replication systems in accordance with one or more embodiments described herein. Repetitive description of like elements employed in other embodiments described herein is omitted for sake of brevity.

In some implementations, a system comprising a processor can perform the computer-implemented method 400 and/or other methods discussed herein. In other implementations, a device comprising a processor can perform the computer-implemented method 400 and/or other methods discussed herein. For example, the device can be a node device in other implementations, a machine-readable storage medium, can comprise executable instructions that, when executed by a processor, facilitate performance of operations, which can be the operations discussed with respect to the computer-implemented method 400 and/or other methods discussed herein. In further implementations, a computer readable storage device comprising executable instructions that, in response to execution, cause a system comprising a processor to perform operations, which can be operations discussed with respect to the computer-implemented method 400 and/or other methods discussed herein.

At 402 of the computer-implemented method 400, a device comprising a processor can determine if the number of upvotes is greater than downvotes. If yes, the data can be sent to compression component 112, at 404, for compression of the data prior to storage. If no, the computer-implemented method 400 can end. Accordingly, the disclosed aspects can determine whether to compress the data or not to compress the data based on decisions obtained by observing several global system attributes as well as application service performance expectation, unlike traditional systems that do not take into account any of the system factors into consideration while deciding.

Figure 5:
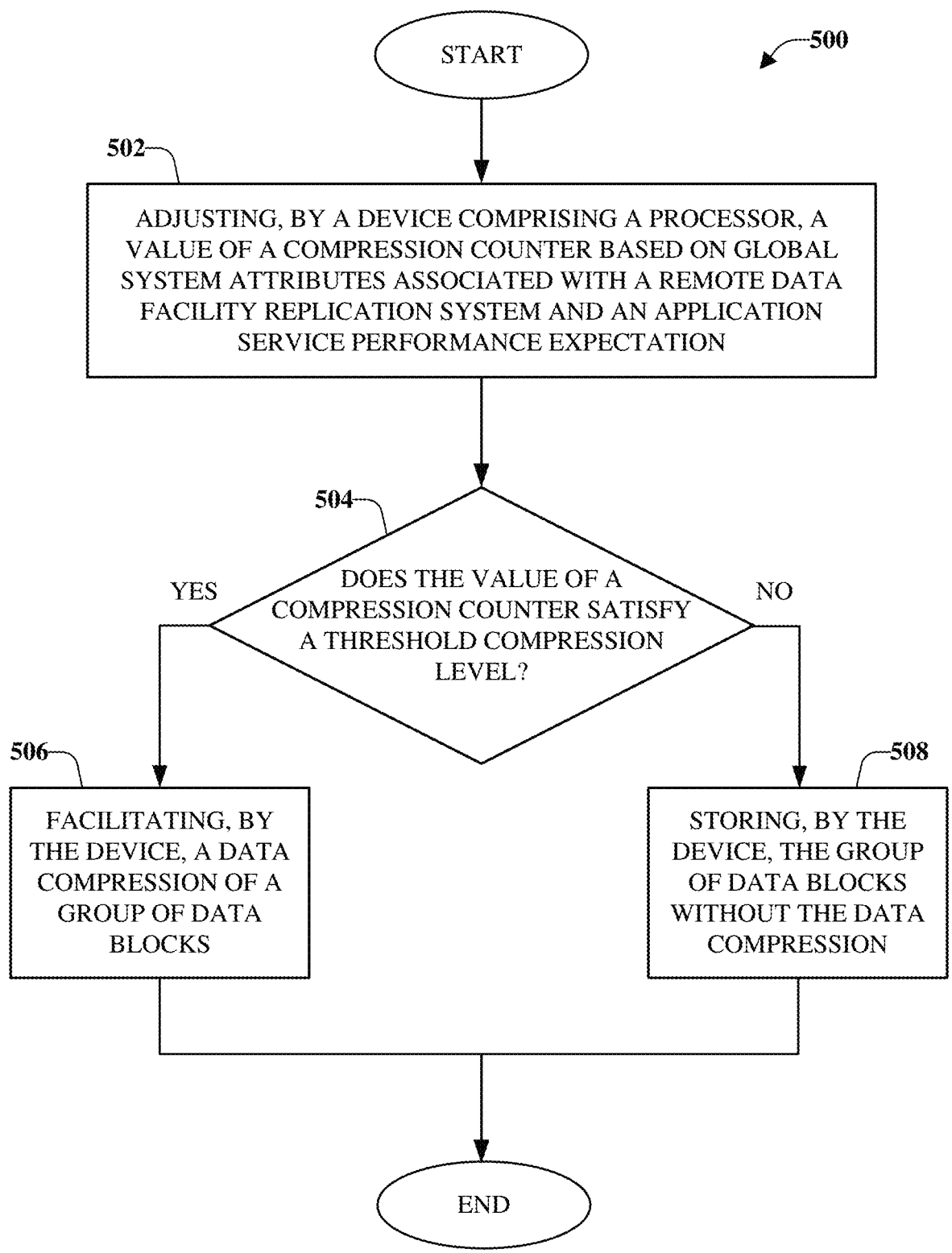
FIG. 5 illustrates a flow diagram of an example, non-limiting, computer-implemented method that selectively determines whether to compress a group of data blocks in accordance with one or more embodiments described herein.

FIG. 5 illustrates a flow diagram of an example, non-limiting, computer-implemented method 500 that selectively determines whether to compress a group of data blocks in accordance with one or more embodiments described herein. Repetitive description of like elements employed in other embodiments described herein is omitted for sake of brevity.

In some implementations, a system comprising a processor can perform the computer-implemented method 500 and/or other methods discussed herein. In other implementations, a device comprising a processor can perform the computer-implemented method 500 and/or other methods discussed herein. For example, the device can be a node device in other implementations, a machine-readable storage medium, can comprise executable instructions that, when executed by a processor, facilitate performance of operations, which can be the operations discussed with respect to the computer-implemented method 500 and/or other methods discussed herein. In further implementations, a computer readable storage device comprising executable instructions that, in response to execution, cause a system comprising a processor to perform operations, which can be operations discussed with respect to the computer-implemented method 500 and/or other methods discussed herein.

At 502 of the computer-implemented method 500, a device comprising a processor can adjust a value of a compression counter based on global system attributes associated with a remote data facility replication system and an application service performance expectation.

A determination is made, at 504, whether a value of the compression counter satisfies a threshold compression level. If the value does satisfy the threshold level ("YES"), at 506 of the computer-implemented method 500 the device can facilitate a data compression of a group of data blocks. Alternatively, if the determination at 504 is that the value of the compression counter does not satisfy the threshold compression level ("NO"), at 508 the device can store the group of data blocks without the data compression.

Figure 6:
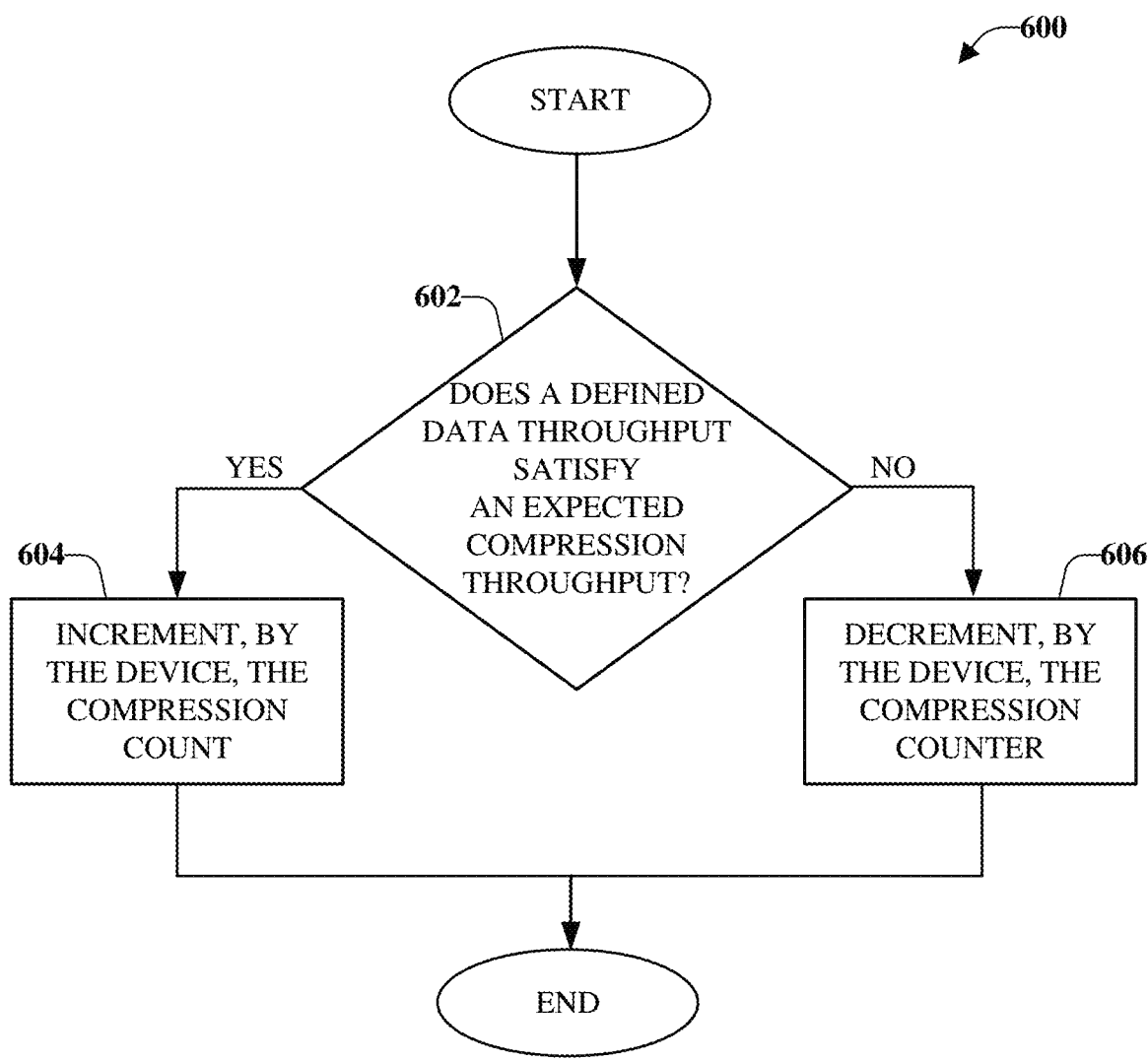
FIG. 6 illustrates a flow diagram of an example, non-limiting, computer-implemented method that selectively facilitates data compression based on data throughput determined based on a workload of a compression component in accordance with one or more embodiments described herein.

FIG. 6 illustrates a flow diagram of an example, non-limiting, computer-implemented method 600 that selectively facilitates data compression based on data throughput determined based on a workload of a compression component in accordance with one or more embodiments described herein. Repetitive description of like elements employed in other embodiments described herein is omitted for sake of brevity.

In some implementations, a system comprising a processor can perform the computer-implemented method 600 and/or other methods discussed herein. In other implementations, a device comprising a processor can perform the computer-implemented method 600 and/or other methods discussed herein. For example, the device can be a node device in other implementations, a machine-readable storage medium, can comprise executable instructions that, when executed by a processor, facilitate performance of operations, which can be the operations discussed with respect to the computer-implemented method 600 and/or other methods discussed herein. In further implementations, a computer readable storage device comprising executable instructions that, in response to execution, cause a system comprising a processor to perform operations, which can be operations discussed with respect to the computer-implemented method 600 and/or other methods discussed herein.

At 602 of the computer-implemented method 600, a device comprising a processor can determine whether a defined data throughput satisfies an expected compression throughput. The defined data throughput can be a desired data throughput. The expected compression throughput can be determined by calculating the maximum compression throughput minus a current workload rate of the compression component.

If the determination is that the defined data throughput satisfies the expected compression throughput ("YES"), at 604, the device can increment the compression counter (e.g., upvote). Alternatively, if the determination at 602 is that the defined data throughput does not satisfy the expected compression throughput ("NO"), at 606 the device can decrement the compression counter (e.g., downvote).

Figure 7:
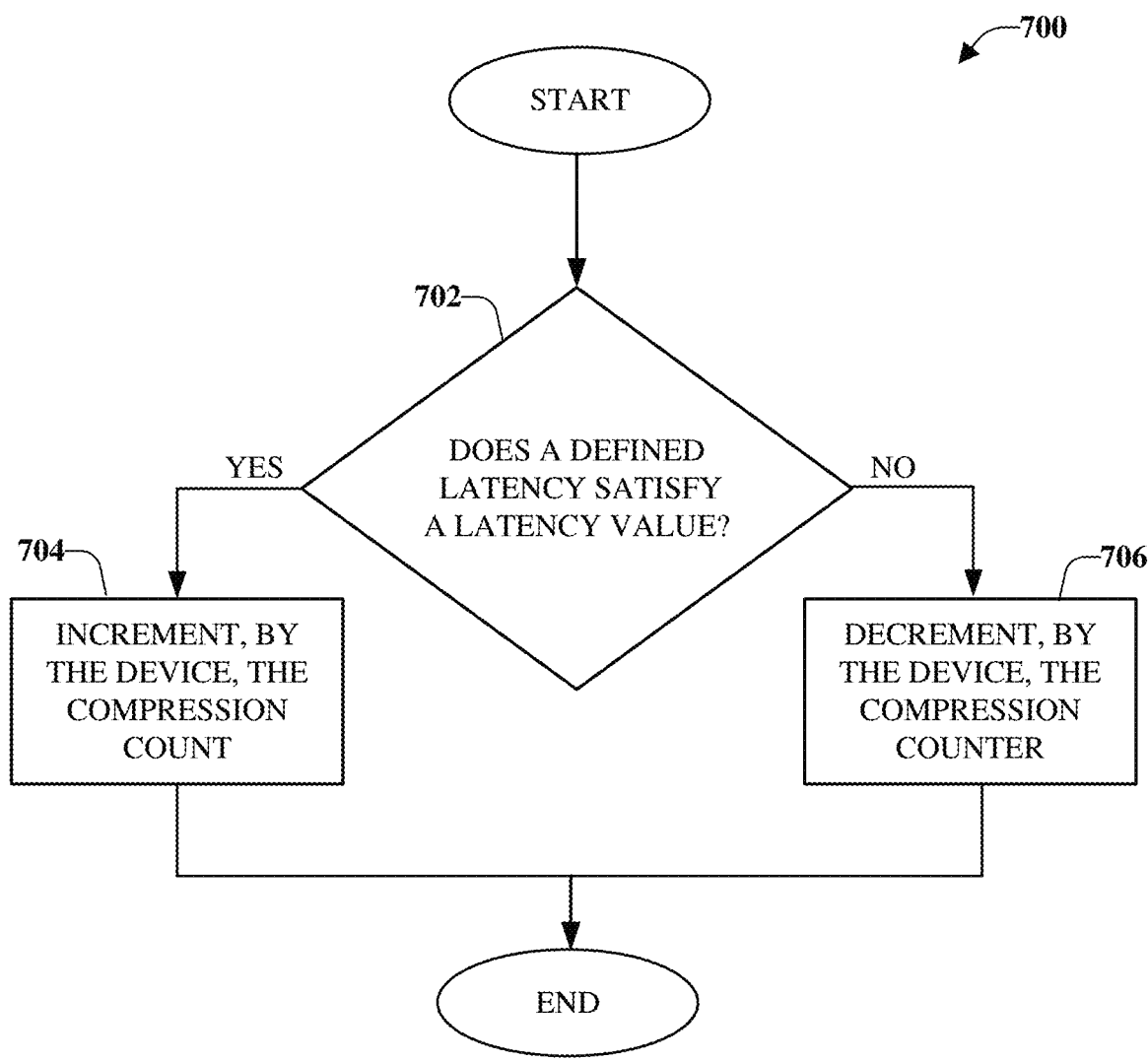
FIG. 7 illustrates a flow diagram of an example, non-limiting, computer-implemented method that selectively performs data compression based on a latency determined based on a workload of a compression component in accordance with one or more embodiments described herein.

FIG. 7 illustrates a flow diagram of an example, non-limiting, computer-implemented method 700 that selectively performs data compression based on a latency determined based on a workload of a compression component in accordance with one or more embodiments described herein. Repetitive description of like elements employed in other embodiments described herein is omitted for sake of brevity.

In some implementations, a system comprising a processor can perform the computer-implemented method 700 and/or other methods discussed herein. In other implementations, a device comprising a processor can perform the computer-implemented method 700 and/or other methods discussed herein. For example, the device can be a node device in other implementations, a machine-readable storage medium, can comprise executable instructions that, when executed by a processor, facilitate performance of operations, which can be the operations discussed with respect to the computer-implemented method 700 and/or other methods discussed herein. In further implementations, a computer readable storage device comprising executable instructions that, in response to execution, cause a system comprising a processor to perform operations, which can be operations discussed with respect to the computer-implemented method 700 and/or other methods discussed herein.

At 702 of the computer-implemented method 700, a device comprising a processor can determine if a defined latency satisfies a latency value. In an example, the latency value can be an amount that is double an expected compression latency value. The expected compression latency value can be calculated as an average latency for compression of a sequence of data blocks.

If the determination at 702 is that the defined latency satisfies the latency value ("YES"), the device can increment the compression counter at 704 (e.g., upvote). Alternatively, if the determination at 702 is that the defined latency does not satisfy the latency value ("NO"), the device can decrement the compression counter (e.g., downvote), at 706 of the computer-implemented method 700.

Figure 8:
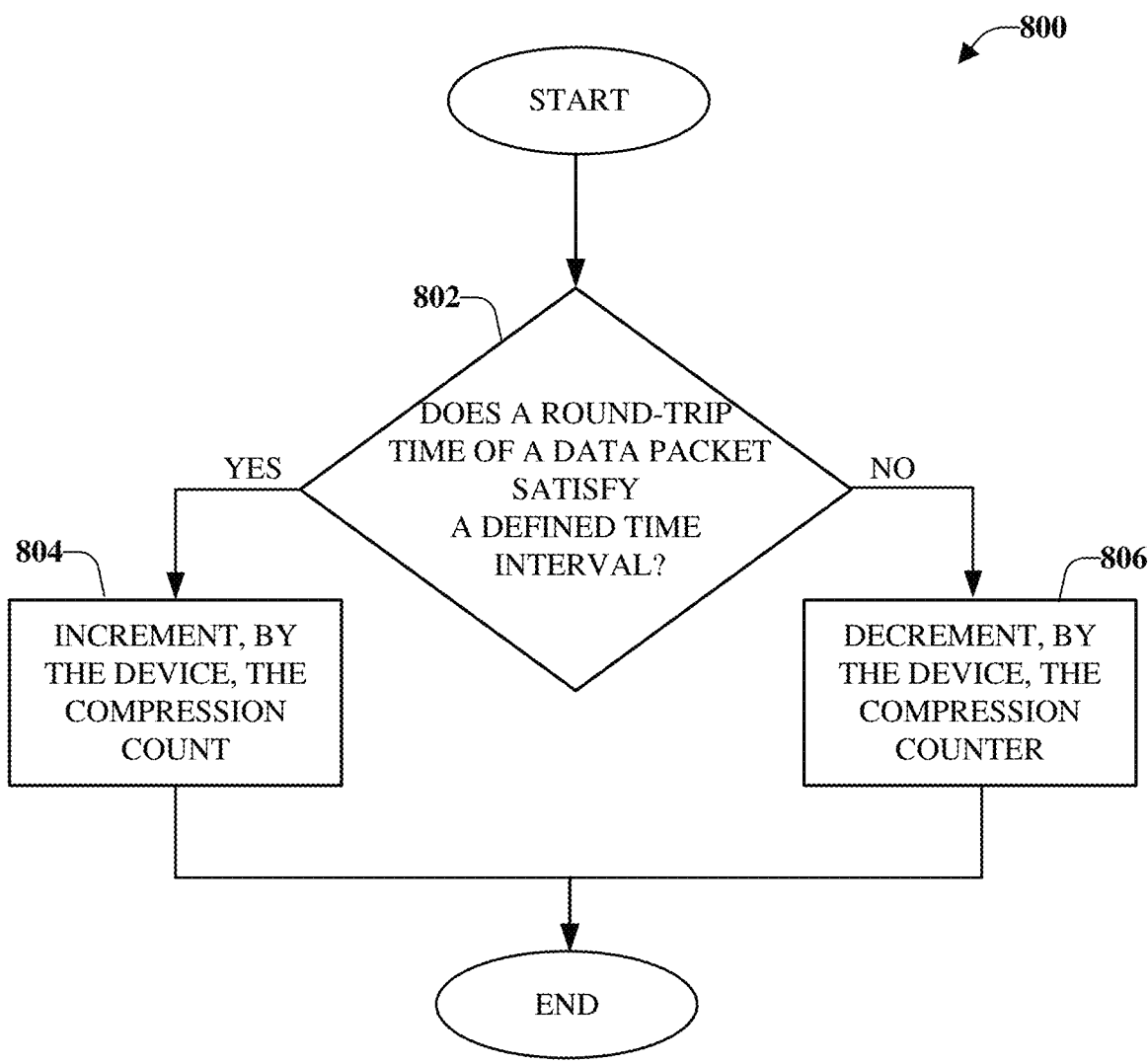
FIG. 8 illustrates a flow diagram of an example, non-limiting, computer-implemented method that selectively performs data compression based on a round-trip time of a data packet in accordance with one or more embodiments described herein.

FIG. 8 illustrates a flow diagram of an example, non-limiting, computer-implemented method 800 that selectively performs data compression based on a round-trip time of a data packet in accordance with one or more embodiments described herein. Repetitive description of like elements employed in other embodiments described herein is omitted for sake of brevity.

In some implementations, a system comprising a processor can perform the computer-implemented method 800 and/or other methods discussed herein. In other implementations, a device comprising a processor can perform the computer-implemented method 800 and/or other methods discussed herein. For example, the device can be a node device in other implementations, a machine-readable storage medium, can comprise executable instructions that, when executed by a processor, facilitate performance of operations, which can be the operations discussed with respect to the computer-implemented method 800 and/or other methods discussed herein. In further implementations, a computer readable storage device comprising executable instructions that, in response to execution, cause a system comprising a processor to perform operations, which can be operations discussed with respect to the computer-implemented method 800 and/or other methods discussed herein.

At 802 of the computer-implemented method 800, a device comprising a processor can determine if a round-trip time of a data packet satisfies a defined time interval. If the determination is that the round-trip time does satisfy the defined time interval ("YES"), at 804, the device can increment the compression counter (e.g., upvote). Alternatively, if the determination at 802 is that the round-trip time does not satisfy the defined time interval ("NO"), at 806, the device can decrement the compression counter (e.g., downvote).

It is noted that the methods discussed with respected to FIGS. 4-8 can be utilized together such that any number of determinations can be made and analyzed, as a group, to determine whether or not to compress data prior to storage as discussed herein.

As discussed herein, the disclosed aspects can concisely and precisely consider complete system behavior (e.g., the RDF performance expectation criteria, current workload on compression unit (e.g., the compression component 112), underlying network behavior) and accurately can make a meticulous decision for data reduction modules of the storage system unlike traditional infrastructures. The disclosed aspects can also eliminate head-of-line blocking and queuing latency on a heavy workload compression system. Further, the disclosed aspects can also consider run time network behavior while making an accurate decision to enable and/or disable data compression to improve the overall performance of an RDF system. Additionally, the disclosed aspects can be fully automated and adaptive to run time behavior and do not require any manual intervention to tune the system to meet desired expectations. A cost-effective solution is also provided with the disclosed aspects and minimal, if any, additional hardware and/or extra dependencies are needed. For example, the disclosed aspects can utilize the existing technology, which can be strategically significant and can provide a cutting-edge solution. Additionally, the disclosed aspects can guarantee desired performance behavior and can proactively take measures to eliminate data link loss risks, reduce overall response time, and ensure high data availability across replication systems.

As used herein, the term "storage device," "first storage device," "storage cluster nodes," "storage system," and the like, can include, for example, private or public cloud computing systems for storing data as well as systems for storing data comprising virtual infrastructure and those not comprising virtual infrastructure. The term "I/O request" (or simply "I/O") can refer to a request to read and/or write data.

The term "cloud" as used herein can refer to a cluster of nodes (e.g., set of network servers), for example, within a distributed object storage system, that are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users.

Further, the term "storage device" can refer to any Non-Volatile Memory (NVM) device, including Hard Disk Drives (HDDs), flash devices (e.g., NAND flash devices), and next generation NVM devices, any of which can be accessed locally and/or remotely (e.g., via a Storage Attached Network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

Further, a storage cluster can include one or more storage devices. For example, a distributed storage system can include one or more clients in communication with a storage cluster via a network. The network can include various types of communication networks or combinations thereof including, but not limited to, networks using protocols such as Ethernet, Internet Small Computer System Interface (iSCSI), Fibre Channel (FC), and/or wireless protocols. The clients can include user applications, application servers, data management tools, and/or testing systems.

As utilized herein an "entity," "client," "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

Figure 9:
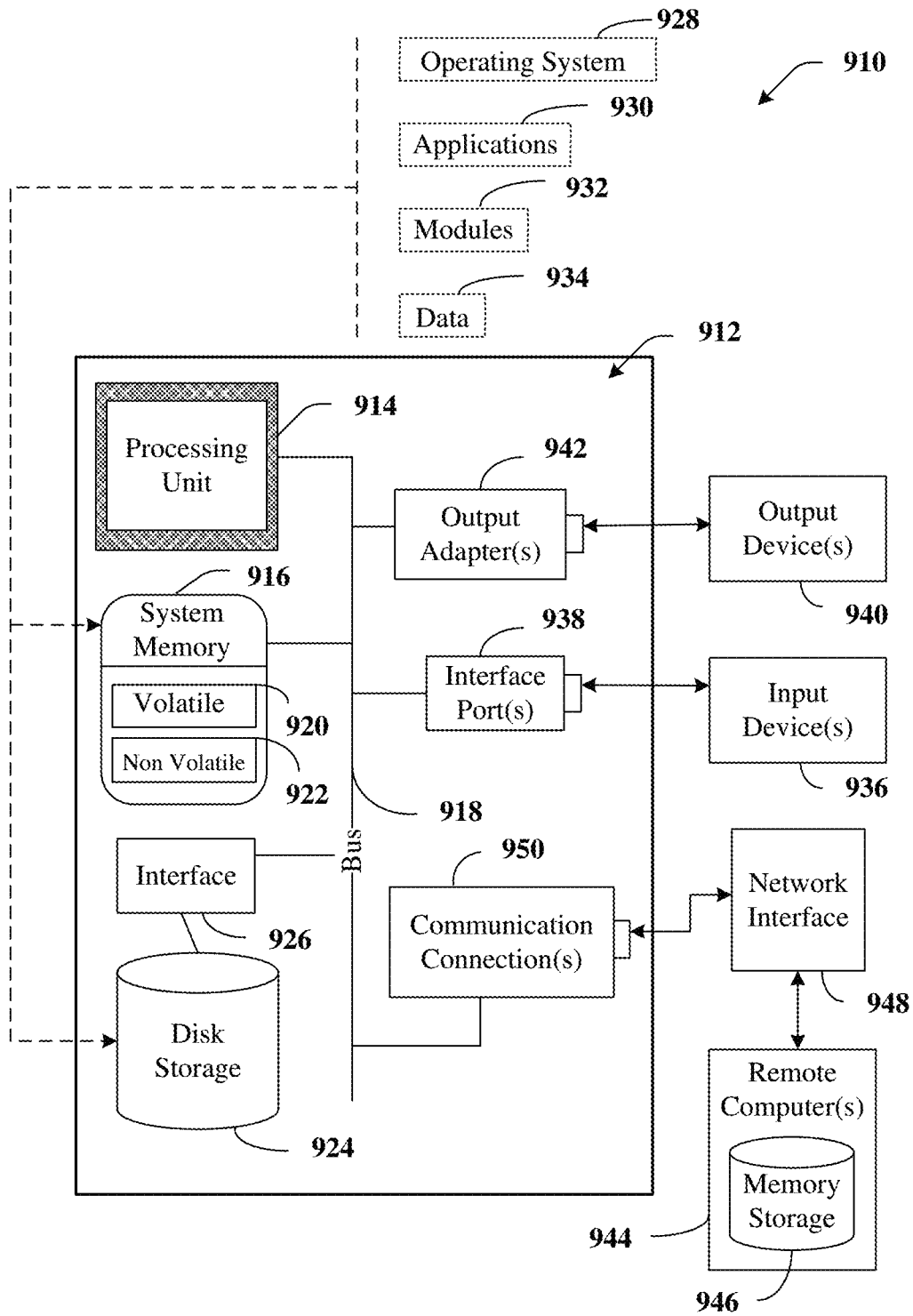
FIG. 9 illustrates an example, non-limiting, computing environment in which one or more embodiments described herein can be facilitated.

In order to provide a context for the various aspects of the disclosed subject matter, FIG. 9 as well as the following discussion are intended to provide a brief, general description of a suitable environment in which the various aspects of the disclosed subject matter can be implemented.

With reference to FIG. 9, an example environment 910 for implementing various aspects of the aforementioned subject matter comprises a computer 912. The computer 912 comprises a processing unit 914, a system memory 916, and a system bus 918. The system bus 918 couples system components including, but not limited to, the system memory 916 to the processing unit 914. The processing unit 914 can be any of various available processors. Multi-core microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 comprises volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can comprise read only memory (ROM), programmable ROM (PROM), electrically programmable ROM (EPROM), electrically erasable PROM (EEPROM), or flash memory. Volatile memory 920 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DR-RAM).

Computer 912 also comprises removable/non-removable, volatile/non-volatile computer storage media. FIG. 9 illustrates, for example a disk storage 924. Disk storage 924 comprises, but is not limited to, devices like a magnetic disk drive, floppy disk drive, tape drive, Jaz drive, Zip drive, LS-100 drive, flash memory card, or memory stick. In addition, disk storage 924 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used such as interface 926.

It is to be appreciated that FIG. 9 describes software that acts as an intermediary between users and the basic computer resources described in suitable operating environment 910. Such software comprises an operating system 928. Operating system 928, which can be stored on disk storage 924, acts to control and allocate resources of the computer 912. System applications 930 take advantage of the management of resources by operating system 928 through program modules 932 and program data 934 stored either in system memory 916 or on disk storage 924. It is to be appreciated that one or more embodiments of the subject disclosure can be implemented with various operating systems or combinations of operating systems.

A user enters commands or information into the computer 912 through input device(s) 936. Input devices 936 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 comprise, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapters 942 are provided to illustrate that there are some output devices 940 like monitors, speakers, and printers, among other output devices 940, which require special adapters. The output adapters 942 comprise, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically comprises many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5 and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the system bus 918. While communication connection 950 is shown for illustrative clarity inside computer 912, it can also be external to computer 912. The hardware/software necessary for connection to the network interface 948 comprises, for exemplary purposes only, internal and external technologies such as, modems including regular telephone grade modems, cable modems and DSL modems, ISDN adapters, and Ethernet cards.

Figure 10:
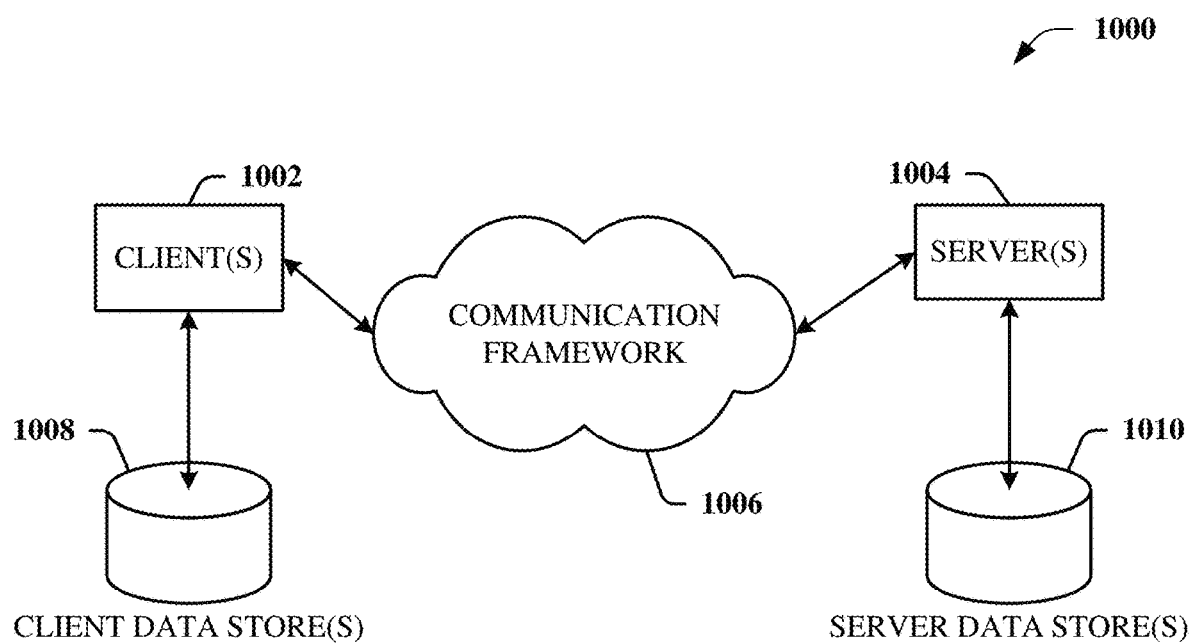
FIG. 10 illustrates an example, non-limiting, networking environment in which one or more embodiments described herein can be facilitated.

FIG. 10 is a schematic block diagram of a sample computing environment 1000 with which the disclosed subject matter can interact. The sample computing environment 1000 includes one or more client(s) 1002. The client(s) 1002 can be hardware and/or software (e.g., threads, processes, computing devices). The sample computing environment 1000 also includes one or more server(s) 1004. The server(s) 1004 can also be hardware and/or software (e.g., threads, processes, computing devices). The servers 1004 can house threads to perform transformations by employing one or more embodiments as described herein, for example. One possible communication between a client 1002 and servers 1004 can be in the form of a data packet adapted to be transmitted between two or more computer processes. The sample computing environment 1000 includes a communication framework 1006 that can be employed to facilitate communications between the client(s) 1002 and the server(s) 1004. The client(s) 1002 are operably connected to one or more client data store(s) 1008 that can be employed to store information local to the client(s) 1002. Similarly, the server(s) 1004 are operably connected to one or more server data store(s) 1010 that can be employed to store information local to the servers 1004.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Disclosed embodiments and/or aspects should neither be presumed to be exclusive of other disclosed embodiments and/or aspects, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one with ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    adjusting, by a device comprising a processor, a value of a counter based on global system attributes associated with a remote data facility replication system and an application service performance expectation, wherein the value of the counter represents votes associated with data compression of a group of data blocks, and wherein the adjusting comprises incrementing the counter based on a first determination that the compression of the group of data blocks is to be performed and decrementing the counter based on a second determination that the compression is not to be performed;
    based on the value of the counter satisfying a function with respect to a threshold amount, facilitating the data compression of the group of data blocks; and
    based on the value of the counter failing to satisfy the function with respect to the threshold amount, storing the group of data blocks without the data compression, wherein the function with respect to the threshold amount being satisfied signifies an acceptable condition for performance of compression on the group of data blocks.

2. The method of claim 1, wherein the global system attributes comprise a workload of a compression component that performs the data compression, and wherein the method further comprises:
    incrementing, by the device, the counter based on a defined data throughput satisfying an expected data throughput, wherein the expected data throughput is a maximum data throughput minus a current workload rate of the compression component.

3. The method of claim 1, wherein the global system attributes comprise a workload of a compression component that performs the data compression, and wherein the method further comprises:
    decrementing, by the device, the counter based on a defined data throughput failing to satisfy an expected data throughput, wherein the expected data throughput is a maximum data throughput minus a current workload rate of the compression component.

4. The method of claim 1, wherein the global system attributes comprise a workload of a compression component that performs the data compression, and wherein the method further comprises:
    incrementing, by the device, the counter based on a defined latency satisfying an amount that is double an expected data latency value, wherein the expected data latency value is defined as an average latency of a sequence of data blocks.

5. The method of claim 1, wherein the global system attributes comprise a workload of a compression component that performs the data compression, and wherein the method further comprises:
    decrementing, by the device, the counter based on a defined latency failing to satisfy an amount that is double an expected data latency value, wherein the expected data latency value is defined as an average latency of a sequence of data blocks.

6. The method of claim 1, wherein the global system attributes comprise a round-trip time of a data packet in the remote data facility replication system, and wherein the method further comprises:

incrementing, by the device, the counter based on a third determination that the round-trip time satisfies a defined time interval, or decrementing, by the device, the counter based on a fourth determination that the round-trip time fails to satisfy the defined time interval.

7. The method of claim 1, further comprising:

incrementing, by the device, the counter based on a third determination that the remote data facility replication system is a data throughput sensitive system, or decrementing, by the device, the counter based on a fourth determination that the remote data facility replication system is a latency sensitive system.

8. A device, comprising:

a processor; and a memory that stores executable instructions that, when executed by the processor, facilitate performance of operations, comprising:

evaluating a performance of a remote data facility replication system according to a defined performance metric, wherein the evaluating the performance is in response to receipt of a sequence of data blocks that are candidates for data reduction in the remote data facility replication system;

comparing a value of a counter with a baseline value that indicates a threshold condition for compression of the sequence of data blocks, wherein the value of the counter is incremented based on a first determination that the compression of the sequence of data blocks is to be performed and decremented based on a second determination that the compression is not to be performed; and based on the value of the counter being more than the baseline value, facilitating the compression of the sequence of data blocks based on the evaluating the performance indicating that the data reduction of the sequence of data blocks increases the performance of the remote data facility replication system above a defined performance level.

9. The device of claim 8, wherein the defined performance metric is a performance expectation, and wherein the evaluating the performance of the remote data facility replication system comprises:

increasing the value of the counter based on a third determination that a profile of the remote data facility replication system is a data throughput sensitive system; or decreasing the value of the counter based on a fourth determination that the profile of the remote data facility replication system is a latency sensitive system.

10. The device of claim 8, wherein the defined performance metric is a performance expectation, and wherein the evaluating the performance of the remote data facility replication system comprises:

increasing the value of the counter based on a third determination that a defined data throughput is less than an expected compression throughput, wherein the expected compression throughput is defined as a maximum compression throughput less a current workload rate.

11. The device of claim 8, wherein the defined performance metric is a performance expectation, and wherein the evaluating the performance of the remote data facility replication system comprises:

decreasing the value of the counter based on a third determination that a defined data throughput is more than an expected compression throughput, wherein the expected compression throughput is defined as a maximum compression throughput less a current workload rate.

12. The device of claim 8, wherein the defined performance metric is a performance expectation, and wherein the evaluating the performance of the remote data facility replication system comprises:

increasing the value of the counter based on a third determination that a defined latency is more than twice an expected compression latency, wherein the expected compression latency is defined as an average latency for the compression of the sequence of data blocks.

13. The device of claim 8, wherein the defined performance metric is a performance expectation, and wherein the evaluating the performance of the remote data facility replication system comprises:

decreasing the value of the counter based on a third determination that a defined latency is less than twice an expected compression latency, wherein the expected compression latency is defined as an average latency for the compression of the sequence of data blocks.

14. The device of claim 8, wherein the defined performance metric is a round-trip time of a data packet in the remote data facility replication system, and wherein the evaluating the performance of the remote data facility replication system comprises:

increasing the value of the counter based on a third determination that the round-trip time is more than a defined time interval.

15. The device of claim 8, wherein the defined performance metric is a round-trip time of a data packet in the remote data facility replication system, and wherein the evaluating the performance of the remote data facility replication system comprises:

decreasing the value of the counter based on a third determination that the round-trip time is less than a defined time interval.

16. The device of claim 8, wherein the compression of the sequence of data blocks is not performed based on the evaluating the performance indicating that the data reduction does not increase the performance of the remote data facility replication system above the defined performance level.

17. A non-transitory computer-readable medium comprising instructions that, in response to execution, cause a system comprising a processor to perform operations, comprising:

evaluating parameters of a remote data facility replication system, wherein the parameters are related to global system attributes and service performance expectations of the remote data facility replication system;

adjusting a combined value of a counter based on respective values for the parameters determined based on the evaluating, wherein the adjusting comprises increasing the combined value of the counter based on a result of a determination being that a compression is to be performed, and decreasing the combined value of the counter based on the result of the determination being that the compression is not to be performed; and determining to perform the compression on a set of data based on the combined value of the counter satisfying a defined value, or to not perform the compression on the set of data based on the combined value of the counter failing to satisfy the defined value, wherein the defined value is a threshold value, the satisfaction of which indicates an acceptable condition for performance of the compression on the set of data.

18. The non-transitory computer-readable medium of claim 17, wherein the determination is a first determination, and wherein the adjusting the combined value comprises:
increasing the combined value of a data counter based on one or more of:
a second determination that a profile of the remote data facility replication system is a data throughput sensitive system;
a third determination that a defined data throughput satisfies an expected compression throughput, wherein the expected compression throughput is defined as a maximum compression throughput less a current workload rate;
a fourth determination that a defined latency is more than twice an expected compression latency, wherein the expected compression latency is defined as an average latency for the compression of a sequence of data blocks; or
a fifth determination that a round-trip time of a data packet in the remote data facility replication system satisfies a defined time interval.

19. The non-transitory computer-readable medium of claim 17, wherein the determination is a first determination, and wherein the adjusting the combined value comprises:
decreasing the combined value of a data counter based on one or more of:
a second determination that a profile of the remote data facility replication system is a latency sensitive system;
a third determination that a defined data throughput fails to satisfy an expected compression throughput, wherein the expected compression throughput is defined as a maximum compression throughput less a current workload rate;
a fourth determination that a defined latency is less than twice an expected compression latency, wherein the expected compression latency is defined as an average latency for the compression of a sequence of data blocks; or
a fifth determination that a round-trip time of a data packet in the remote data facility replication system fails to satisfy a defined time interval.

20. The non-transitory computer-readable medium of claim 17, wherein the combined value of the counter fails to satisfy the define value indicates that the compression does not increase a performance level of the remote data facility replication system above a defined performance level.

* * * * *